(12) United States Patent
Pereira De Gouveia Lopes De Almeida

(10) Patent No.: US 10,233,894 B2
(45) Date of Patent: Mar. 19, 2019

(54) ARTIFICIAL COASTAL-PROTECTION REEF WITH ENERGY GENERATION UNIT WITH OR WITHOUT DIRECT CONTACT WITH SEAWATER

(71) Applicant: UNIVERSIDADE DE COIMBRA, Coimbra (PT)

(72) Inventor: José Paulo Pereira De Gouveia Lopes De Almeida, Coimbra (PT)

(73) Assignee: UNIVERSIDADE DE COIMBRA, Coimbra (PT)

( * ) Notice: Subject to any disclaimer, the term of this patent is extended or adjusted under 35 U.S.C. 154(b) by 259 days.

(21) Appl. No.: 15/035,763

(22) PCT Filed: Nov. 11, 2014

(86) PCT No.: PCT/PT2014/000066
§ 371 (c)(1),
(2) Date: May 11, 2016

(87) PCT Pub. No.: WO2015/072869
PCT Pub. Date: May 21, 2015

(65) Prior Publication Data
US 2016/0298596 A1  Oct. 13, 2016

(30) Foreign Application Priority Data

Nov. 12, 2013  (PT) .......................................... 107286
Nov. 12, 2013  (PT) .......................................... 107287

(51) Int. Cl.
*F03B 13/22*   (2006.01)
*E02B 3/04*   (2006.01)
(Continued)

(52) U.S. Cl.
CPC .............. *F03B 13/22* (2013.01); *E02B 3/046* (2013.01); *E02B 9/08* (2013.01); *F03B 11/08* (2013.01);
(Continued)

(58) Field of Classification Search
CPC .......... F03B 13/22; F03B 11/08; F03B 13/10; F03B 15/18; F03B 13/148; F03B 13/141;
(Continued)

(56) References Cited

U.S. PATENT DOCUMENTS 3,989,951 A * 11/1976 Lesster ................. F03B 13/148
290/53
5,700,108 A   12/1997 Bishop et al.
(Continued)

FOREIGN PATENT DOCUMENTS

GB   2341645 A   3/2000
JP   55990773 A  5/1984
WO   03/078831 A1  9/2003

*Primary Examiner* — Eldon T Brockman
(74) *Attorney, Agent, or Firm* — Mark M. Friedman

(57) ABSTRACT

An artificial reef to be anchored to the seabed comprises two or more juxtaposed conduits which are positioned in parallel with the direction of wave propagation. Both conduits include directrices. The upper conduit includes directrices which drive the flow of the wave's crest, and the lower conduit includes directrices which drive the water diverging from the apertures in the area under the wave's trough. The upper and lower conduits are hydraulically connected, each connection comprising a shut-down valve associated with a useful energy-generating unit.

9 Claims, 3 Drawing Sheets

Figure 1:
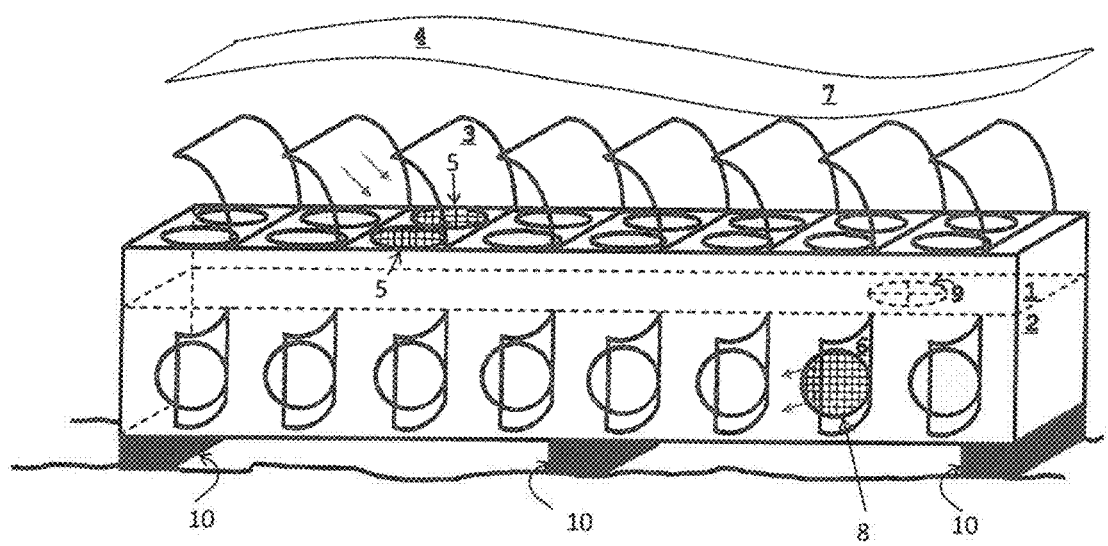

(51) Int. Cl.
    *F03B 13/14*          (2006.01)
    *E02B 9/08*           (2006.01)
    *F03B 11/08*          (2006.01)
    *F03B 13/10*          (2006.01)
    *F03B 15/18*          (2006.01)

(52) U.S. Cl.
    CPC ............ *F03B 13/10* (2013.01); *F03B 13/141* (2013.01); *F03B 13/148* (2013.01); *F03B 15/18* (2013.01); *F05B 2240/97* (2013.01); *F05D 2220/20* (2013.01); *Y02A 10/26* (2018.01); *Y02E 10/38* (2013.01)

(58) Field of Classification Search
    CPC . E02B 9/08; E02B 3/046; Y02A 10/26; F05D 2220/20; Y02E 10/38; F05B 2240/97
    See application file for complete search history.

(56) References Cited

U.S. PATENT DOCUMENTS 8,525,364 B1 *   9/2013   Costas .................... F03B 13/22
                                                                 290/42
2008/0050178 A1 *   2/2008   Erlingsson ................ E02B 3/06
                                                                 405/21

\* cited by examiner

ARTIFICIAL COASTAL-PROTECTION REEF WITH ENERGY GENERATION UNIT WITH OR WITHOUT DIRECT CONTACT WITH SEAWATER

TECHNICAL SCOPE OF THE INVENTION

The artificial reef intended for coastal protection, comprising an energy-generating unity with or without direct contact with the sea water, falls within the technical scope of both the devices for coastal protection and the devices for harnessing energy from the sea waves.

STATE OF THE ART

Currently there are a number of devices for coastal protection as well as devices for harnessing energy from the waves. In general, devices intended for harnessing energy from waves do not provide a coastal protection since, in most cases, their location is far from the shore and, on the other hand, they only extract energy from flowing water in normal conditions of sea agitation, being usually out-of-service in case of storm.

One of the main issues as regards harnessing energy from waves is the economic profitability considering the huge investment required. One way of overcoming this inconvenient is to invent devices which are able to offer an effective coastal protection, susceptible of being recognized and co-funded by the government authorities responsible for the maintenance and spatial planning of coastlines.

Another major issue when it comes to harnessing energy from waves is related to the design restrictions of the proposed devices, which prevent them from harnessing the different forms of energy. In effect, there are commonly devices which capture the pressure differential energy produced by the gap between the wave's crest and the wave's trough, but which do not capture the wave's kinetic energy these areas and vice-versa, this representing an important technical issue to be solved in order to make the said devices more profitable and efficient. This is relevant in as much as the kinetic energy of a regular sea wave is approximately half of its total energy.

Therefore, one of the technical issues to be solved is to invent a device capable of simultaneously executing the following functions:

1) To capture the pressure differential energy as well as the kinetic energy from the sea waves, for the purpose of generating useful energy;

2) To jointly use the two forms of energy captured, as above mentioned, in order to propel one same useful energy-generating unit (for instance, comprised of hydroelectric turbo-generator groups);

3) To reduce the amount of energy produced from storm waves, causing the pounding of waves and thus dissipate part of their power before reaching the shore;

4) To be fully submerged and, therefore, invisible on the sea surface;

5) To be provided with filters aimed at smoothly limiting the water reflux without the need to use mechanical parts with shafts, ball-and-socket joints or other type of joints.

In addition to these technical issues, there two more aspects which are extremely important and must be urgently addressed:

6) The contact with marine living creatures, as well as with sands and other suspended sediments, may cause damages both to mobile mechanical components and marine life;

7) The contact with the sea water, which causes the early corrosion of the device's components, mainly the most sensitive and expensive ones, such as is usually the case of the parts comprising the useful energy-generating unit.

In this phase of the description, the desired benefits of this device are highlighted:

By solving the technical issue mentioned in item 1) above, one intends to increase the production of the device in order to make it more effective and economically feasible;

By solving the technical issue mentioned in item 2) above, one intends to reduce the complexity of the device since both forms of the natural energy captured are absorbed by the same kind of useful energy-generating unit;

By solving the technical issue mentioned in item 3) above, an additional advantage is obtained with the said device in terms of its contribution to coastal protection, in order to make its licensing easier from the environmental point of view, as well as to eventually requesting some kind of state financial participation;

By solving the technical issue mentioned in item 4) above, a further additional advantage is obtained with the said device and which is the landscape invisibility, in order to make its licensing easier from the environmental point of view;

By solving the technical issue mentioned in item 5) above, one intends to protect the marine life and the energy-generating unity avoiding its mutual contact (filter effect), and also to make the flow smoother when the water reflux occurs, thus mitigating abrupt variations in pressure (flexible and partially anti-reflux valve effect). The said variations, when resulting from the unevenness of heights of the wave trains, can be absorbed by means of elastic deformation of the filter. Additionally, one also intends to reduce its cost and vulnerability (there are no mobile mechanical parts), as well as to offer a faster response to variations in the flow direction, since the partially cut pieces of fabric are of low weight and small size. Alternatively, nanotechnology can be developed which is capable of implementing this type of effect in only one piece of fabric.

By solving the technical issue mentioned in items 6 and 7 above, one intends not only to increase the durability and reliability of the useful energy-generating unit, since the contact with marine life, sands and suspended sediments is totally impossible, but also to reduce its purchase price, since, for instance, freshwater can be used inside the device, thus allowing to employ conventional generation technology used in rivers. As a result, the environment is fully preserved since there is no direct contact between marine life and the useful energy-generating unit, which is commonly provided with mobile components susceptible of causing damage.

The closest state of the art comprises the following patent documents:

WO 03078831 A1 2003 Sep. 25;
GB 2341645 A 2000 Mar. 22.

The patent application WO 03078831 A1 claims only the capture of maximum and minimum pressure of a fluid of fluctuating and variable pressure (as is the case of a sea wave), i.e., only the capture of its Pressure Differential Energy in order to generate useful energy, and reference is made to harnessing of kinetic energy for the production of useful energy with recourse to a water wheel or a turbine.

It shall be noted that kinetic energy resulting from the fluid flow between the reservoirs, as referred to in the claims of the said patent application, has nothing to do with the Sea Wave Kinetic Energy propagating outside the reservoirs and having horizontal velocities in the wave's crest and trough, therefore tangent to the active openings, which then prevents its kinetic energy from being captured by this device.

The aforementioned patent application also claims a floating device, which is not the case of the one disclosed by the invention for which protection is being requested.

The patent application GB 2341645 A claims only the harnessing of the Pressure Differential Energy under the sea wave's crest and trough, in order to generate useful energy. Also in the said application a floating device is claimed, which is completely distinct from the one disclosed in the invention claiming an apparatus for anchorage to the seabed near the shore, according to specific conditions of depth and orientation in order to originate the pounding of storm waves.

Considering the abstract, claims, drawings and detailed description of the (hereinafter presented) device, several differences can be easily established in terms of technical characteristics, comparatively to the closest state of the art.

None of the above mentioned patent applications disclose devices comprising elements—namely the more sensitive and expensive ones of the useful energy-generating unit—which are isolated from the contact with the sea water in order to avoid early corrosion of the same, as in the case of the second embodiment of this invention.

From the following description, other differences as regards both the structural and functional aspects of the devices disclosed by this new patent application will become evident to those skilled in the art.

Figure 2:
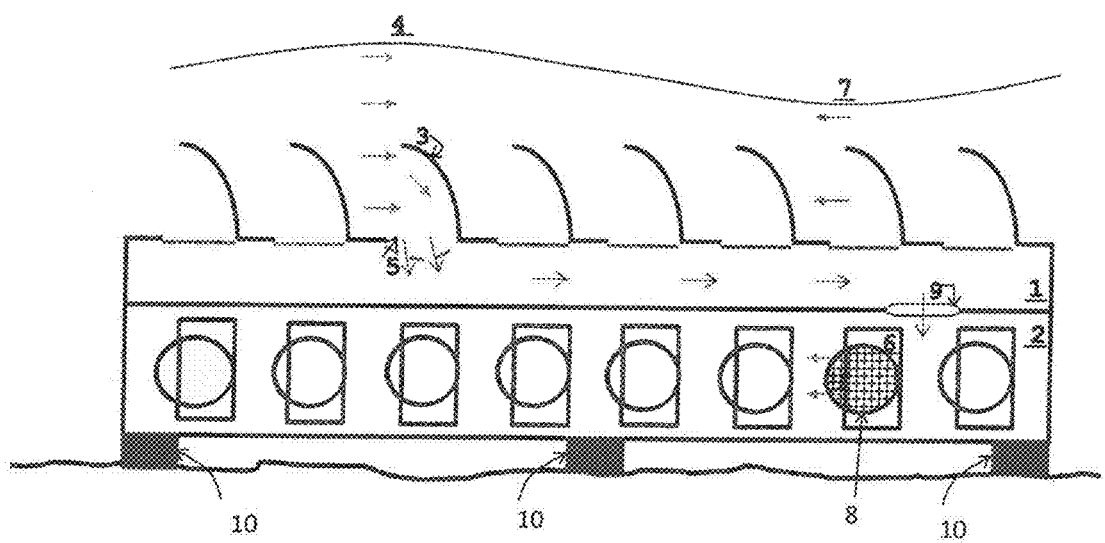
Figure 3:
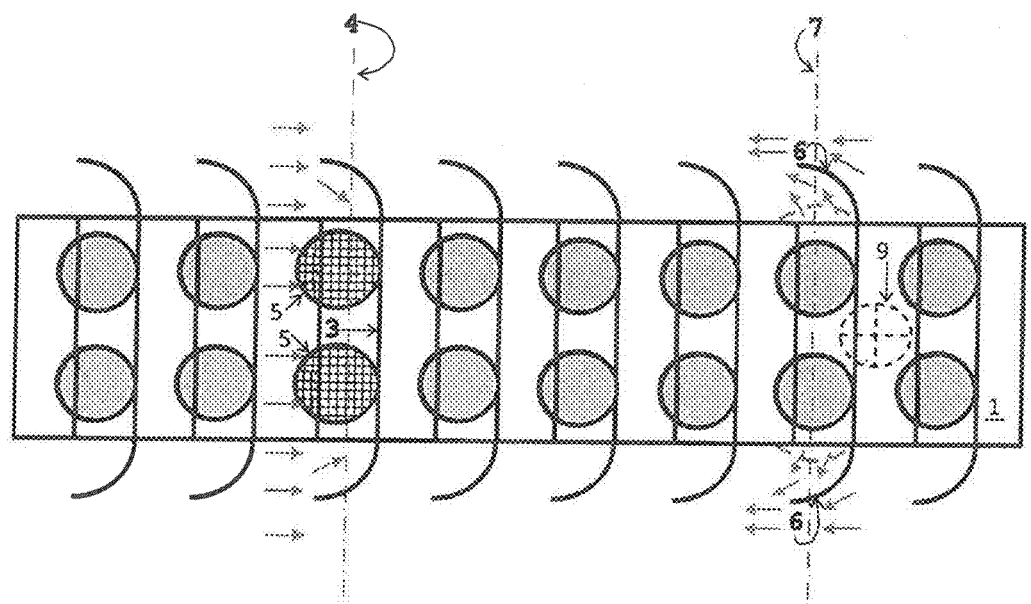
Figure 4:
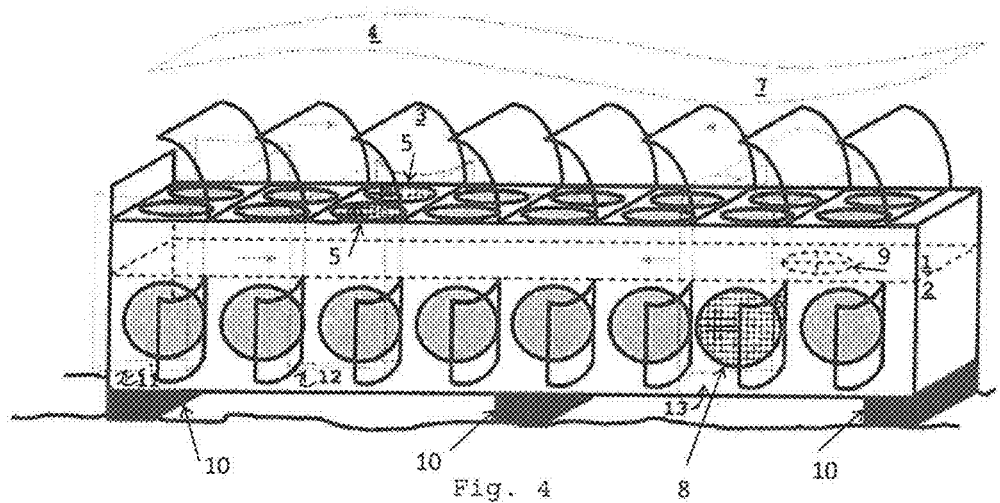
Figure 5:
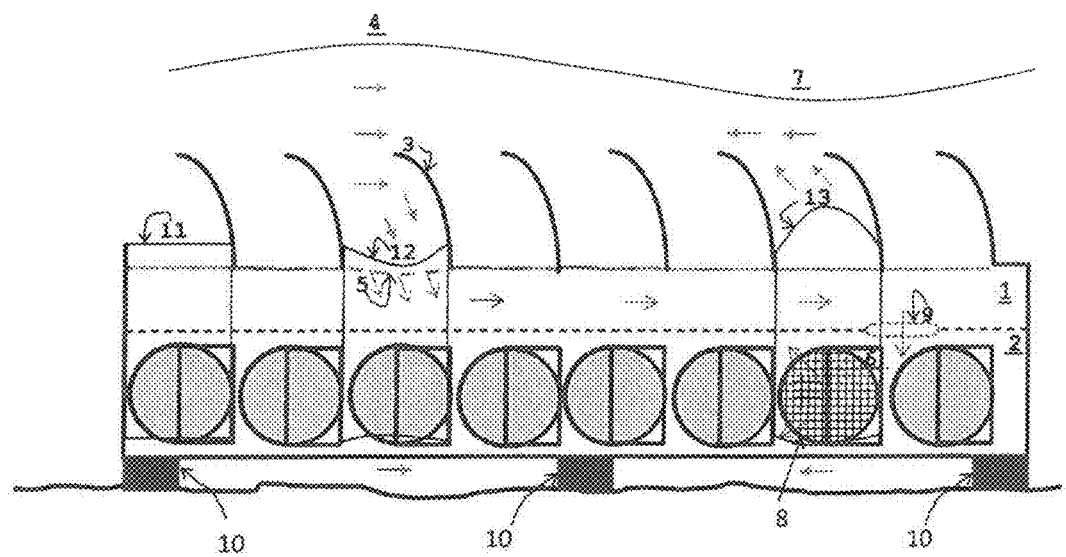

The following description is based upon the enclosed drawings which, without a limiting character, illustrate:

FIG. 1, a perspective view of the artificial reef for coastal protection provided with an energy-generating unity in direct contact with the sea water, which is the object of this invention;

FIG. 2, a profile view of the reef illustrated in the previous figure;

FIG. 3, a plan view of the same reef;

FIG. 4, a perspective view of a second embodiment of the invention, i.e. the artificial reef for coastal protection provided with an energy-generating unity having no direct contact with the sea water;

FIG. 5, a profile view of the reef illustrated in FIG. 4; e

Figure 6:
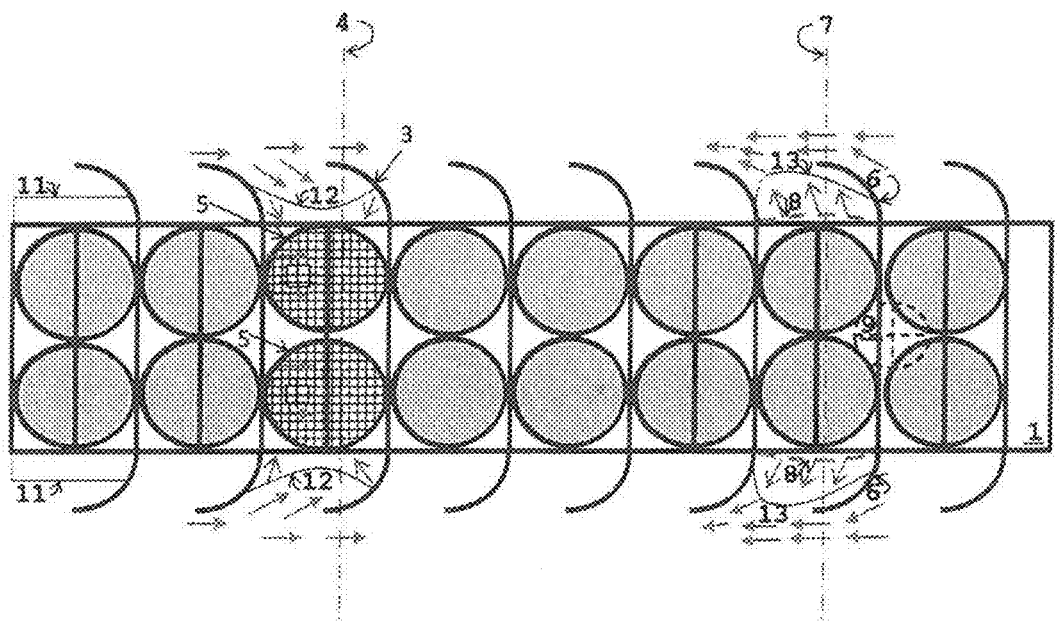

FIG. 6, a plan view of the reef illustrated in FIGS. 4 and 5.

DETAILED DESCRIPTION OF THE INVENTION

The embodiments illustrated in the drawings relate to an artificial reef intended for coastal protection comprising an energy-generating unit, with or without direct contact with the sea water. It is a multi-purpose device whose operating principle, as regards useful energy production, is based upon the understanding that under the wave's crest (4) the water velocity is horizontal in the direction of propagation and under the wave's trough (7) it is also horizontal but in the opposite direction. If appropriate directrices are used, it is possible to change the water direction in these areas for harnessing its kinetic energy so as to cause a flowing to occur in the hydraulic connection between the conduits (1) and (2). Additionally, and as a particular feature of this device, the horizontal velocities are phased with the extreme wave heights, i.e. with the wave's crest (4) and the wave's trough (7), and so the use of flexible reflux-limiting filters duly positioned in openings will cumulatively allow the creation of a pressure differential between the entry (5), which in each moment is activated under the wave's crest (4), and the exit (8), which in each moment is activated under the wave's trough (7). Therefore, it is possible to harness not only the energy from the pressure differential but also, and simultaneously, the wave's kinetic energy, both energies causing a flow in the hydraulic connection between the conduits (1) and (2) which will actuate the useful energy-generating unit (9).

The artificial reef comprised of this multi-purpose device has an operating principle, as regards coastal protection, which is based upon the knowledge that the sea waves, when propagating over low seabeds will attain a high steepness, which after reaching a certain point will give origin to the wave's pounding with the crest surpassing the lower section of the wave. This phenomenon occurs in nature when high waves pass over the reefs. This process causes the energy to dissipate and the wave's height to be reduced. In order to benefit from this effect, the depth of anchorage in the seabed, which is adjustable by means of the legs (10), must be one that allows the pounding of storm waves only. In these circumstances, the shut-down valve of the useful energy-generating unit is closed (9) not only with the aim of protecting the said unit but mainly of preventing the flow from occurring between the conduits (1) and (2), thus ensuring the water-tightness of entries and exits, which are then able to adequately endure the strong hydraulic stress produced by storm waves. In case of storm, it is also possible to open the shut-down valve (9) and eliminate the resistance offered by the useful energy-generating unit, in which case the flow freely occurs between the conduits (1) and (2), and the excess pressure is released by the flexible reflux-limiting filters.

These devices are aimed at being installed over the seabed, preferably near the shore and, according to a preferred embodiment, they are basically comprised of two or more juxtaposed conduits (1) and (2) which are positioned parallely to the direction of waves propagation. The upper conduit (1) is provided with large directrices (3) conveniently curved from the horizontal up to the vertical and converging to the entries (5). The lower conduit is provided with large directrices (6) conveniently curved from the normal direction of the exit plane to the horizontal parallely to the exit plane, diverging from the exits (8), all of these apertures being provided with flexible filters made from composite fabric, which will limit the abrupt reflux of flow. The conduits are hydraulically connected, each connection being provided with a shut-down valve associated to an energy-generating unit (9). During a storm, the shut-down valve is closed and the water remains immobilized inside the apparatus which behaves like a watertight monolith and, similarly to a reef, induces the pounding of huge waves passing over it, thus protecting the coastline. When there is no storm, the waves are lower and pass over the apparatus without pounding. In these circumstances, the shut-down valve is opened and the flow of sea water in the hydraulic connection will directly actuate the energy-generating unit.

If the length of conduits (1) and (2) is equal to or higher than the length of the sea wave, the flow between them will be one of high power. When it is very high, the artificial reef may be built with multiple hydraulic connections and multiple energy-generating units.

It is also possible to build the reef with the conduits (1) and (2) having a length lower than the sea wave's length, but in this case the flow between them will be of a lower power and, consequently, the production of electric power will be reduced.

As can be observed in the drawings of FIGS. 1 to 3 illustrating a first embodiment of this invention, the device is under the action of a sea wave's crest (4) and trough (7). The length of the conduits (1) and (2) equals the length of the device, and their width equals the one of the device. In the slab between the conduits (1) and (2), the hydraulic connection is shown with a shut-down valve and the useful energy-generating unit (9), which is comprised, for instance, of hydraulic turbo-generator groups.

In the upper surface of the conduit (I) one can see a directrix (3) changing the water direction towards the entry (5) wherein the reflux-limiting filter allows the water to pass through the large mesh, contrarily to what happens in the remaining entries.

In the lateral surface of the conduit (2) one can see a directrix (6) changing the direction of the water coming from the exit (8), wherein the reflux-limiting filter allows the water to pass through the large mesh, contrarily to what happens in the remaining exits.

The legs supporting the device anchored to the seabed (10) are also shown.

In FIG. 2 a directrix (3) is depicted which drives the water towards an entry (5), which is provided with a reflux-limiting filter and allows the water to pass through the large mesh, contrarily to what happens in the remaining entries.

A directrix (6) is also shown driving the water outwards from the exit (8), which is provided with a reflux-limiting filter and allows the water to pass through the large mesh, contrarily to what happens in the remaining exits.

Also illustrated is the conduit (1) which drives the water from the entry with reflux-limiting filter (5) to the energy-generating unity provided with a shut-down valve (9), and the conduit (2) which drives the water from the energy-generating unit provided with a shut-down valve (9) to the exit with reflux-limiting filter (8).

As can be observed in FIG. 3, in the upper surface of the conduit (1) there is a directrix (3) changing the water direction towards the entry (5) wherein the reflux-limiting filter allows the water to pass through the large mesh, contrarily to what happens in the remaining entries.

In the lateral surfaces, two directrices (6) are shown changing the direction of the water coming from two exits (8), wherein the reflux-limiting filter allows the water to pass through the large mesh, contrarily to what happens in the remaining exits.

The second embodiment, illustrated in FIGS. 4 to 6, has the same characteristics of the embodiment illustrated in FIGS. 1 to 3, i.e. the conduits (1) and (2) having a length equal to the one of the device and a width also equal to the one of the device. In the slab between the conduits (1) and (2), the hydraulic connection is shown with a shut-down valve and the useful energy-generating unit (9), which is comprised, for instance, of hydraulic turbo-generator groups. In this embodiment of the invention, for the useful energy-generating unity (9) to be actuated by means of an inner fluid, and at the same time being preserved from the direct contact with the sea water, the pads (11), (12) and (13) made from a thin and flexible material, for instance rubber, are installed in each set of entries and exists located in the same vertical line of each segment of the device, thus causing the flow in the hydraulic connection to be driven by the fluid cyclically entering to and exiting from the said pads, this fluid being previously introduced into the device.

In order to ensure a protection in case of storm, the shut-down valve of the useful energy-generating unit (9) must be closed so that this unit is protected, but mainly in order to prevent the flow from occurring between the conduits (1) and (2), thus ensuring immobilization of the pads' surfaces which, in this case, assume the normal position (11), causing the device to operate similarly to a monolith. In order to benefit from this effect, the depth of anchorage in the seabed, which is adjustable by means of the legs (10), must be one that allows the pounding of storm waves only. In case of storm, it is also possible to open the shut-down valve (9) and eliminate the resistance offered by the useful energy-generating unit, in which case the flow freely occurs between the conduits (1) and (2), and the excess pressure is released by the flexible reflux-limiting filters, which communicate with the pads, this process being in all aspects identical to the one described for the first embodiment of the invention, except for the fact that everything occurs internally without direct contact with the sea water, thanks to the watertight mobile borders which are arranged in the said pads (11), (12) and (13).

Similarly, in the upper surface of the conduit (1), one can see a directrix (3) changing the direction of the water being driven towards the pad (12) that covers two entries, wherein the reflux-limiting filter allows the inner fluid to pass through the large mesh (5), contrarily to what happens in the remaining entries. In the lateral surface of the conduit (2) one can see a directrix (6) changing the direction of the water, thereby suctioning the pad (13) which covers one exit, wherein the reflux-limiting filter allows the inner fluid to pass through the large mesh (8), contrarily to what happens in the remaining exists.

The legs supporting the device anchored to the seabed are also shown (10).

Only three pads are illustrated, one of them in normal position (11), the other one compressed (12) and the last one expanded (13), which cover the entries and exits of the same segment of the device.

The FIG. 5 is a profile view of the device according to the second embodiment of the invention, under the action of the crest (4) and trough (7) of a sea wave. Also illustrated is a directrix (3) driving the water towards the pad (12) that covers one entry (5) provided with a reflux-limiting filter which allows the inner fluid to pass through the large mesh, contrarily to what happens in the remaining entries. A directrix (6) is also shown changing the direction of the water, thereby suctioning the pad (13) which covers the exit (8), wherein the reflux-limiting filter allows the inner fluid to pass through the large mesh, contrarily to what happens in the remaining exists. Also illustrated is the conduit (1) which drives the inner fluid from the entry (5) provided with a reflux-limiting filter to the energy-generating unit (9) provided with a shut-down valve, and the conduit (2) which drives the inner fluid from the energy-generating unit (9) provided with a shut-down valve to the exit (8) provided with a reflux-limiting filter.

In FIG. 6, in the upper surface of the conduit (1) there is a directrix (3) changing the water direction towards a pad (12) which covers the entry (5) wherein the reflux-limiting filter allows the water to pass through the large mesh, contrarily to what happens in the remaining entries. In the lateral surfaces, two directrices (6) are shown changing the direction of the water thereby suctioning the pads which cover the exits (8) wherein the reflux-limiting filter allows the inner fluid to pass through the large mesh, contrarily to what happens in the remaining exits.

The said filters in the apertures (5) and (8) of the conduits (1) and (2) are comprised of two layers of fabric which are attached to one another, the first having a large mesh and the second being watertight or almost watertight. This second layer is provided with pieces of fabric which, as a result of several cuts made to them, are only partially connected to the main body, the said pieces being of a higher size than that of the large mesh of the first layer, but small however when compared to the size of the apertures (5) and (8) which are filled by these filters. The mesh is of an appropriate size so as to prevent undesired marine elements from entering, and the material of both fabrics, as well as the cuts made to them, are designed to provide flexibility and a partial limitation of the reflux, in order to avoid sudden transitions in the flow occurring inside the device. These filters will limit the water reflux in the direction from the fabric with cuts to the large mesh fabric, since the pieces of fabric with cuts remain in contact with the mesh when the reflux occurs, and for that reason the filters shall be applied with the large mesh layer facing outwards on the entries (5) of the conduit (1) and turned inwards on the exits (8) of the conduit (2), thus ensuring the filtering and the reflux control, not requiring the use of any shaft or mechanical joint, and this without an abrupt and total interruption of the reflux as occurs with the conventional non-return valves, and the flexibility of the assembly being appropriate to absorb, by means of elastic deformation, sudden increases in pressure.

EXAMPLES OF EMBODIMENTS OF THE INVENTION

After a specific depth for installation of this invention is chosen, for example, 15 meters depth, the more frequent length and direction of waves propagation are determined, which will be taken as reference in that location. The next step is to build the conduits (1) and (2) with the apertures (5) and (8), and their respective directrices (3) and (6), which according to the preferred embodiment will be made from reinforced concrete. In order to this invention to capture the maximum power, its length must be equal or higher than the length of the sea wave. However, the device of this invention can have a length lower than that of the sea wave, although in this case the power captured will obviously be lower. It shall be noted that the walls and slabs will comprise hollows with communicating tubes with the outer space, which are provided with filling and emptying valves, so that they can operate as ballast reservoirs (non-illustrated) thus ensuring buoyancy whenever required. After the construction work with reinforced concrete, the hydromechanical equipment is installed which is essentially comprised of reflux-limiting filters in two overlapped layers of fabric fully covering the apertures, and a useful energy-generating unit with a shut-down valve in the hydraulic connection between the conduits (1) and (2).

After being built in dry dock, the artificial reef for coastal protection comprising an energy-generating unit with or without direct contact with the sea water will be towed to the installation site, since it acts as a floating body. Once arrived there, the bottom valves (non-illustrated) are opened, which allow flooding of the device for an almost full submersion of the device. Then, valves (non-illustrated) are opened which will allow flooding of the existing hollows in slabs and walls in order to cause the full submersion of the device and, consequently, its anchoring at the installation site. The inversion of this final phase of submersion can be performed by injecting air into the existing hollows in the walls and bottom slab of the device, thus allowing the device to be returned to the water surface for servicing and repair operations, Alternatively, the device can be built in steel, fibreglass or other materials, thus resulting in lighter structures which in that case will be provided with ballast, such as for instance concrete.

The conduits (1) and (2) can be more than two, and they can have a non-rectangular cross-section. They are also susceptible of being placed according to other geometrical arrangements, such as for example, side by side or in series, with the hydraulic connection(s) between these two types of conduits (1) and (2) being also comprised of conduits.

The device can also be provided with flywheels on the rotating elements of the energy-generating unit, in order to ensure stabilized operation, particularly in case the length of the device is different from the length of the sea wave.

The said device forming the artificial reef shall be anchored to the seabed, near the shore, and with its largest part in parallel with the direction of wave's propagation, having its height adjusted by means of the said legs (10) in order to cause pounding of storm waves only.

The aforementioned directrices can be developed as a seamless part covering all the entries and exits located in the same vertical line of each segment of the device.

HOW IS THIS INVENTION SUSCEPTIBLE OF INDUSTRIAL APPLICABILITY

The fact that this invention involves the construction of large components, with simple configurations, made from reinforced concrete, steel, and fabric, allows industrial production methods to be adopted which make use of pre-manufacture and employ industry-wide known materials such as steel, concrete, fibreglass, or composite materials. Because this is a modular device, its implementation in waves' parks can be achieved through the serial production of the same, followed by its anchorage in extended areas near the shore, which is particularly advantageous from the point of view of its industrial applicability, since the shipyards as well as the civil construction companies with the largest industrial capacity, are usually located near the major urban centres of the coastline region in most countries worldwide.

Another form of industrial applicability is within the scope of maritime works for protection against coastal erosion. In the said scope, this invention can be built with an appropriate height in order to cause pounding of storm waves passing over it, thus mitigating its coastal erosion effect.

REFERENCE INDEX (1) Inlet conduit
(2) Outlet conduit
(3) Entry directrix
(4) Wave's crest
(5) Water inlet provided with a reflux-limiting filter
(6) Exit directrix
(7) Wave's trough
(8) Water outlet provided with a reflux-limiting filter
(9) Useful energy-generating unit with shut-down valve
(10) Device's leg
(11) Pad in normal position
(12) Compressed pad
(13) Expanded pad

The invention claimed is:

1. An artificial reef for coastal protection comprising:
an energy-generating unit configured for capturing kinetic energy and pressure differential energy resulting from a difference in water heights between wave crests and troughs, converting the kinetic energy and pressure differential energy into useful energy:
- at least one upper conduit including a plurality of apertures;
- at least one lower conduit including a plurality of apertures;
- the upper conduit and the lower conduit are substantially parallel to each other and in communication with each other to define a flow pathway from the upper conduit apertures through the lower conduit apertures;
- at least one directrix along the upper conduit proximate to an aperture and extending over at least a portion of the aperture to change a direction of horizontal flow under a wave's crest and concentrating the water flow into the aperture;
- at least one directrix along the lower conduit proximate to an aperture and extending over at least a portion of the aperture to change the direction of the outgoing flow transforming the outgoing flow into a flow in accordance with the direction of the natural flow under wave's trough to suction water out of the aperture; and,
  - a valve between the upper and lower conduits configured to automatically close and automatically open in response to predetermined conditions.

2. The artificial reef according to claim 1, additionally comprising:
at least one filter in each of the apertures of the upper and lower conduits, each of the filters comprising:
a first mesh layer, and
a second layer comprising a watertight fabric for controlling reflux.

3. The artificial reef according to claim 1, wherein the at least one directrix along the upper conduit includes a plurality of directricies, each directrix of the plurality of directricies proximate to an aperture and extending over at least a portion of the aperture and configured for breaking waves before they reach the shore, and, the at least one directrix along the upper conduit includes a plurality of directricies proximate to an aperture and extending over at least a portion of the aperture.

4. The artificial reef according to claim 1, wherein the at least one upper conduit comprises and at least one lower conduit each include a non-rectangular cross-section.

5. The artificial reef according to claim 1, additionally comprising: hollow walls for receiving air injected into the walls for at least one of floating or submerging the artificial reef.

6. The artificial reef according to claim 1, additionally comprising: a flywheel; and, rotating elements for generation energy, in communication with the flywheel.

7. An artificial reef according to claim 1, additionally comprising:
a plurality of legs, the legs being adjustable for adjusting the height of the artificial reef from the surface of the sea floor.

8. The artificial reef according to claim 1, wherein said at least one directrix along the upper conduit and said at least one directrix along the lower conduit are aligned along a vertical line of each segment of the artificial reef.

9. The artificial reef according to claim 1, additionally comprising pads for covering the plurality of apertures along the upper and lower conduits, the pads being filled with fluid.

* * * * *

UNITED STATES PATENT AND TRADEMARK OFFICE
CERTIFICATE OF CORRECTION

PATENT NO. : 10,233,894 B2
APPLICATION NO. : 15/035763
DATED : March 19, 2019
INVENTOR(S) : José Paulo Pereira De Gouveia Lopes De Almeida Page 1 of 1

It is certified that error appears in the above-identified patent and that said Letters Patent is hereby corrected as shown below:

In the Claims

Claim 4, Column 10, Line 14 should be corrected as follows:
Change "least one upper conduit comprises and at least one lower"
To -- least one upper conduit and at least one lower --

Signed and Sealed this
Seventh Day of May, 2019

Andrei Iancu
*Director of the United States Patent and Trademark Office*